United States Patent
Dodson, III

(10) Patent No.: US 6,756,601 B2
(45) Date of Patent: Jun. 29, 2004

(54) HIGH SPEED OPTOCOUPLER

(75) Inventor: George Bertram Dodson, III, Glendale, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 10/196,610

(22) Filed: Jul. 16, 2002

(65) Prior Publication Data

US 2004/0011973 A1 Jan. 22, 2004

(51) Int. Cl.⁷ .............................................. G02B 27/00
(52) U.S. Cl. ........................ 250/551; 250/205; 323/902
(58) Field of Search .................................. 250/551, 205; 327/109, 514; 323/221, 233, 902

(56) References Cited

U.S. PATENT DOCUMENTS 4,752,693 A * 6/1988 Nagano ...................... 250/551
5,734,170 A * 3/1998 Ikeda ......................... 250/551

* cited by examiner

Primary Examiner—Thanh X. Luu
Assistant Examiner—Seung C Sohn
(74) Attorney, Agent, or Firm—Fogg and Associates, LLC; Scott V. Lundberg

(57) ABSTRACT

Apparatus and method for increasing the bandwidth of an optocoupler includes cascode coupling the optocoupler driver transistor with a buffer so as to reduce voltage variations across the driver transistor.

15 Claims, 4 Drawing Sheets

HIGH SPEED OPTOCOUPLER

TECHNICAL FIELD

The present invention is related in general to optocouplers, and in particular to a high speed optocoupler that exhibits improved performance in an analog signal mode.

BACKGROUND INFORMATION

In an optocoupler, a driver stage takes an input signal and converts it to an optical signal. The optical signal is then sensed by a detector stage, which converts it back to an electrical signal. Ideally, the two stages (driver and detector) introduce little or no delay or distortion into the signal being coupled.

Some common applications for optocouplers are isolated switching power supplies, medical sensor isolation, and isolation of process control transducers to name only a few. In particular, isolated switching power supplies typically use one or more optocouplers to provide isolation in a feedback loop. Optocouplers do an excellent job of isolation, minimizing circuit complexity and reducing cost. One of the disadvantages of using an optocoupler is its relatively low bandwidth. As switching frequencies and bandwidth for isolated power supplies continue to be increased to reduce size and accommodate high di/dt loads, the bandwidth of the optocoupler becomes a significant limitation on power supply performance.

For the reasons stated above and for additional reasons stated hereinafter, which will become apparent to those skilled in the art upon reading and understanding the present specification, there is a need in the art for an improved optocoupler. The above-mentioned problems of optocouplers and other problems are addressed by the present invention, at least in part, and will be understood by reading and studying the following specification.

SUMMARY

Figure 1:
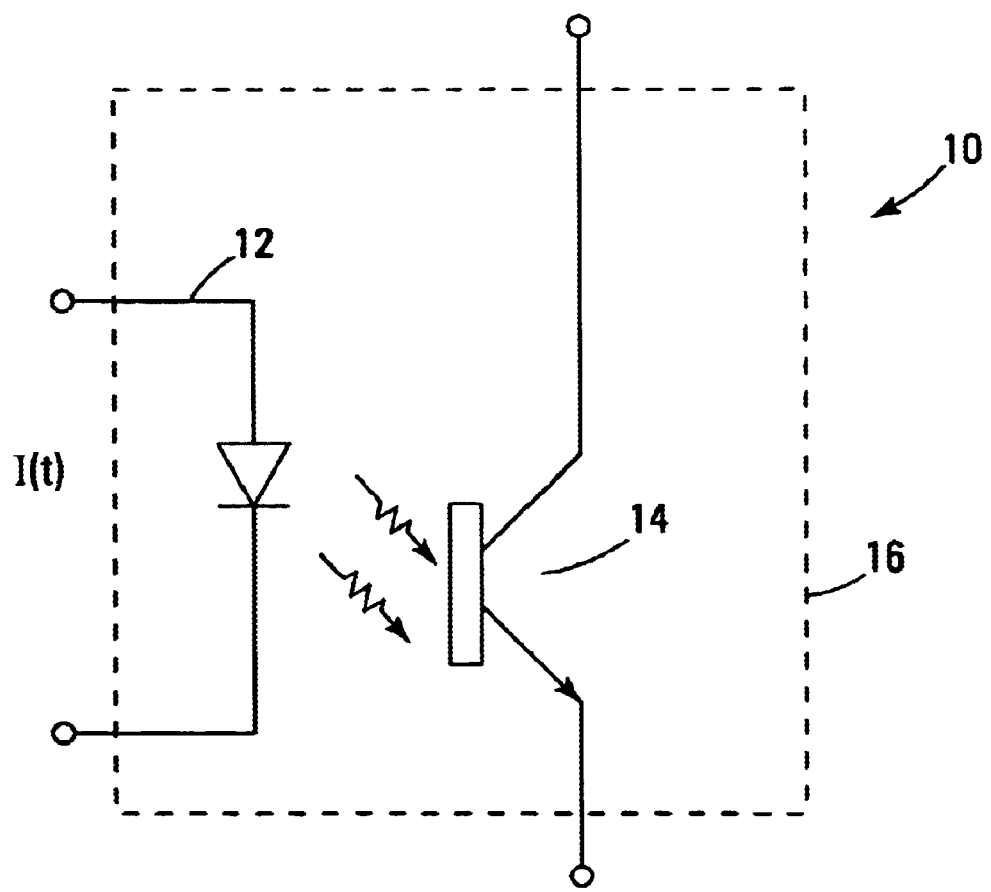
FIG. 1 is an illustration of one example of a prior art optocoupler.

The above mentioned problems with optocouplers and other problems are addressed by the present invention and will be understood by reading and studying the following specification.

In one embodiment a circuit is disclosed. The circuit includes a phototransistor, a light emitting diode, a load and a buffer. The phototransistor comprises an emitter, a light-sensitive base and a collector. The light emitting diode is optically coupled to the light-sensitive base of the phototransistor. The buffer is coupled between the emitter of the phototransistor and the load. The buffer has an impedance value that is much lower than a load resistance of the load, wherein a voltage variation across the phototransistor is reduced by the buffer.

In another embodiment, a circuit is disclosed. The circuit includes an optocoupler, a load and a buffer. The optocoupler has an input and an output. The buffer cascode is coupled between the optocoupler output and the load. The optocoupler has an apparent load resistance value that is much lower than a load resistance of the load.

In further another embodiment an optocoupler circuit is disclosed. The optocoupler circuit includes an optocoupler driver and a buffer. The buffer device is cascode coupled to the optocoupler driver. Moreover, the buffer has an impedance. The impedance of the buffer has a value much lower than a load resistance, wherein a voltage variation across the optocoupler driver is reduced.

In still another embodiment, a method of improving the performance of an optocoupler coupled to a load is disclosed. The method comprises buffering the load by a constant voltage device in cascode between the load and the optocoupler, wherein the impedance of the buffer has a value that is much less than a load resistance.

In still yet another embodiment, an isolated power supply is disclosed. The isolated power supply includes a primary circuit, a secondary circuit, a PWM controlled switch, an optocoupler and a buffer. The PWM controlled switch is in the primary circuit. The optocoupler provides isolated feedback from the secondary circuit to the primary circuit and the buffer transistor is coupled in cascode to the optocoupler.

In further still another embodiment, a method of improving the performance of an optocoupler coupled to a load, the optocoupler comprising a driver transistor having an emitter and collector is disclosed. The method comprises a cascoding the driver transistor with a second transistor. Reducing a voltage variation across the driver transistor by the optocoupler having an apparent load resistance value that is much lower than a load resistance of the load.

DETAILED DESCRIPTION

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

FIG. 1 shows a basic circuit for an optocoupler 10. Optocoupler 10 includes a emitter 12 such as a light emitting diode, optically coupled to a detector 14 such as a phototransistor or a photodiode. Emitter 12 and detector 14 are typically enclosed in an insulating housing 16 that provides emitter to detector electrical isolation and ambient optical isolation so as to minimize ambient interference. Optocoupler 10 may be constructed of discrete components or integrated on a common substrate.

Figure 2:
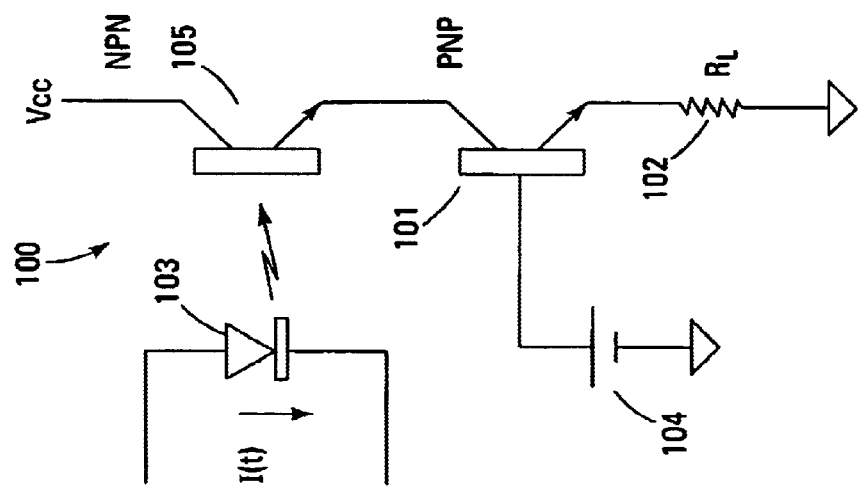
FIG. 2 is an illustration of a first embodiment of a high speed optocoupler according to the present invention.

A first embodiment of the invention is shown in FIG. 2. Optocoupler 100 includes a light emitting diode 103, optically coupled to a driver transistor 105. In this example, driver transistor 105 is shown as an NPN phototransistor, however a PNP device might also be used. Optocoupler 100 is coupled in cascode to a buffer transistor 101 which in turn is coupled to load 102. In this example buffer transistor 101 is a PNP transistor. Buffer 101 effectively freezes voltage variations across driver 105. Voltage reference 104 provides a constant potential to the base of buffer transistor 101. The apparent load resistance for optocoupler 100 is the emitter impedance of transistor 101 which is a value much lower than load resistance 102. Therefore, voltage variation with changes in output current through optocoupler 100 is advantageously greatly reduced or nearly eliminated and bandwidth is increased.

Figure 3:
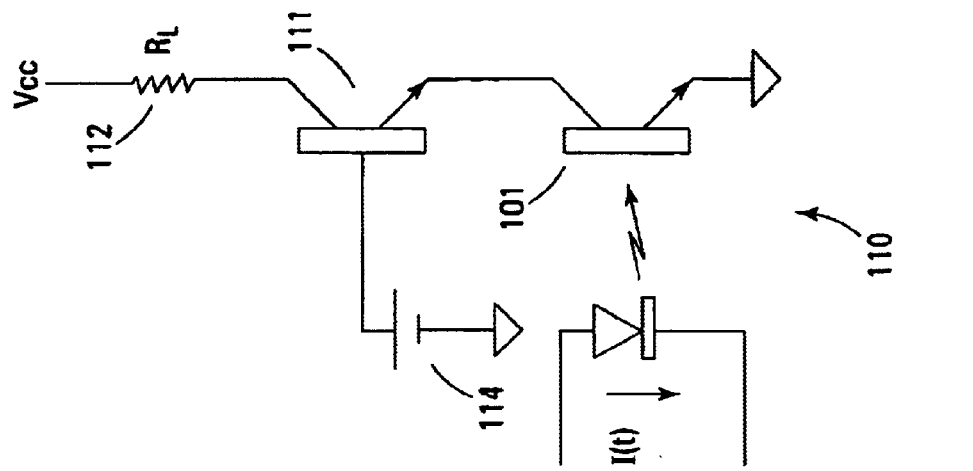
FIG. 3 is an illustration of a second embodiment of a high speed optocoupler according to the present invention.

A second embodiment is shown in FIG. 3. In this example, optocoupler 110 is buffered from voltage variations at load 112 by NPN transistor 111. Voltage reference 114 holds the base of transistor 111 at constant potential. The apparent load resistance for optocoupler 110 is the emitter impedance of transistor 111 which is a value much lower than load resistance 112, therefore voltage variation with changes in output current through optocoupler 110 is greatly reduced or nearly eliminated and bandwidth is increased.

Figure 4:
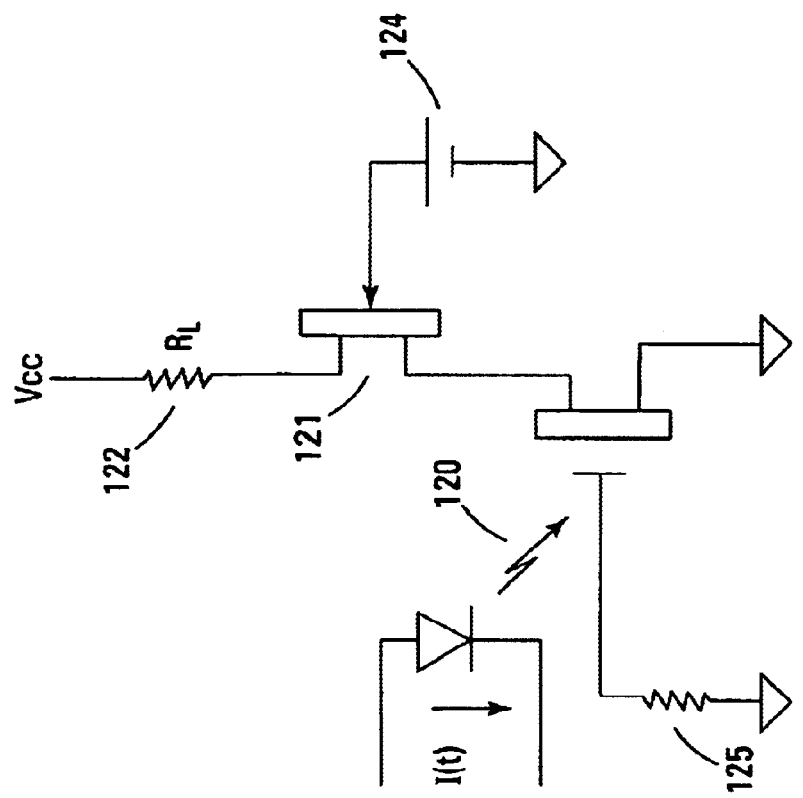
FIG. 4 is an illustration of a third embodiment of a high speed optocoupler according to the present invention.

A third embodiment of the present invention is shown in FIG. 4. In this example, optically coupled FET device 120, is buffered from voltage variations at load 122 by N channel junction FET 121. The apparent load resistance for optocoupler 120 is the source impedance of transistor 121 which is a value much lower than load resistance 122, therefore voltage variation with changes in output current through optocoupler 120 is greatly reduced or nearly eliminated and bandwidth is increased. As high pinch off junction FETs can be self biasing, voltage reference 124 may in some cases be zero and the voltage reference eliminated. Resistor 125 acts to bleed off excess charge from the gate of optically coupled FET 120 and thus allow turn off of optically coupled FET 120.

Figure 5:
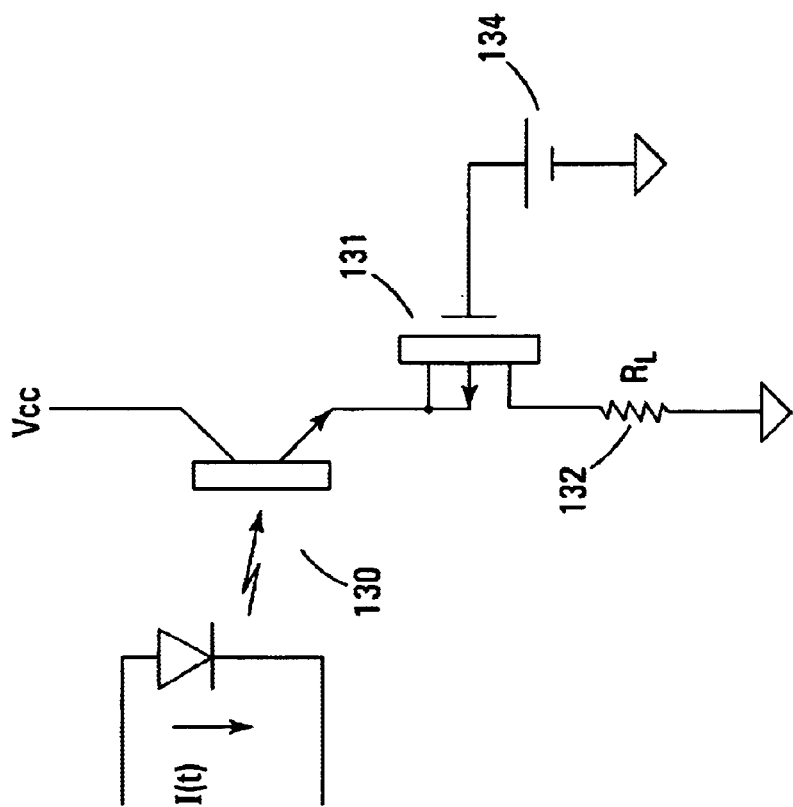
FIG. 5 is an illustration of a fourth embodiment of a high speed optocoupler according to the present invention.

A fourth embodiment of the present invention is shown in FIG. 5. In this example, optically coupled transistor 130 is buffered from voltage variations at load 132 by P channel MOSFET 131. Reference 134 holds the gate of MOSFET 131 at constant potential. The apparent load resistance for optocoupler 130 is the source impedance of transistor 131 which is a value much lower than load resistance 132, therefore voltage variation with changes in output current through optocoupler 130 is greatly reduced or nearly eliminated and bandwidth is increased.

Figure 6:
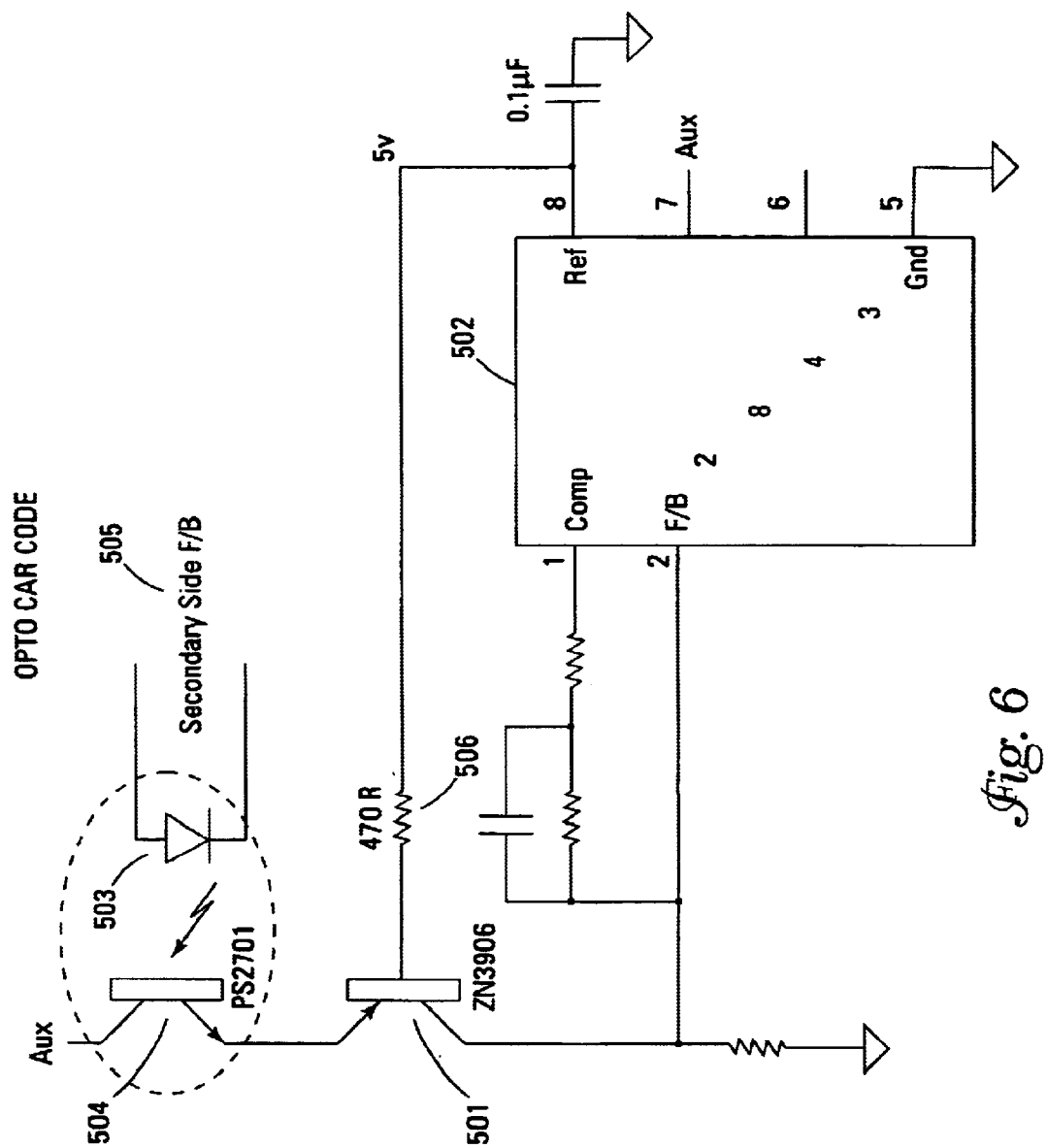
FIG. 6 is an illustration of a switching power supply circuit that employs an optocoupler according to the present invention.

FIG. 6 shows an example of an isolated feedback switching power supply according to the present invention. The circuit includes a primary and a secondary. The secondary side of the power supply 505 is connected to LED 503 which is optically coupled to phototransistor 504. Transistor 504 is connected in cascode to transistor 501. In this example, the emitters of transistors 504 and 501 are connected. The collector of transistor 501 is connected to the feedback input of pulse width modulator 502. For convenience, the reference voltage of 5 volts is taken from the pulse width modulator 502 and fed to the base of transistor 501 to maintain a constant bias potential fro the base of transistor 501. In the preferred embodiment of the invention, a bias voltage of 5 volts at the base of transistor 501 allows a zero to 5V feedback signal swing available at the collector of transistor 501 while maintaining a nearly constant collector to emitter potential of approximately 10V to opto coupler 504 when the circuit is operated with an auxiliary supply voltage of approximately 15V. Advantageously, the performance of the opto coupler is generally near optimum. Resistor 506, is added to improve the stability of cascode transistor 501.

Only a few of the possible combinations of bipolar, junction FET and MOSFET devices have been demonstrated, but the principles in each are the same. Bandwidth of an optically coupled device can be increased by a cascode buffer between the optically coupled output device and the load resistance.

Conclusion

The present invention provides a method and apparatus to extend the bandwidth of optocoupler devices and thereby extend the performance of isolated switching converters as well as other apparatus that employ optocouplers The invention also advantageously increases the output voltage swing of the optocoupler for a given operating current level or reducing operating current level while maintaining output voltage swing levels independent of bandwidth.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A circuit comprising:
   a phototransistor comprising an emitter, a light-sensitive base and a collector,
   a light emitting diode optically coupled to the light-sensitive base of the phototransistor,
   a load; and
   a buffer coupled between the emitter of the phototransistor and the load, the buffer having an impedance value much lower than a load resistance of the load; wherein a voltage variation across the phototransistor is reduced by the buffer.

2. The circuit of claim 1 wherein the buffer is cascade coupled to the phototransistor.

3. The circuit of claim 2, wherein the buffer comprises a bipolar transistor.

4. The circuit of claim 2, wherein the buffer comprises a j-fet transistor.

5. The circuit of claim 2, wherein the buffer comprises a MOSFET transistor.

6. A circuit comprising:
   an optocoupler having an input and an output;
   a load; and
   a buffer cascade coupled between the optocoupler output and the load, the optocoupler having an apparent load resistance value that is much lower than a load resistance of the load.

7. The circuit of claim 6, wherein the apparent load resistance comprises the emitter impedance of a transistor.

8. An optocoupler circuit comprising:
   an optocoupler driver;
   a buffer device cascade coupled to the optocoupler driver, the buffer having an impedance, the impedance of the buffer having a value much lower than a load resistance;
   wherein a voltage variation across the optocoupler driver is reduced.

9. A method of improving the performance of an optocoupler coupled to a load, comprising:
   buffering the load by a constant voltage device in cascode between the load and the optocoupler; wherein the impedance of a buffer has a value that is much less than a load resistance.

10. The method of claim 9 wherein the constant voltage device comprises a bipolar transistor.

11. The method of claim 9 wherein the constant voltage device comprises a j-fet transistor.

12. The method of claim 9 wherein the constant voltage device comprises a MOSFBT transistor.

13. An isolated power supply, comprising:
   a primary circuit;
   a secondary circuit;
   a PWM controlled switch in the primary circuit;
   an optocoupler that provides isolated feedback from the secondary circuit to the primary circuit; and
   a buffer transistor coupled in cascode to the optocoupler.

14. A method of improving the performance of an optocoupler coupled to a load, the optocoupler comprising a driver transistor having an emitter and collector, the method comprising;
   cascoding the driver transistor with a second transistor;
   reducing a voltage variation across the driver transistor by the optocoupler having an apparent load resistance value that is much lower than a load resistance of the load.

15. The method of claim 14 further comprising coupling a voltage reference to a gate of the second transistor.

* * * * *